United States Patent
Kwatra et al.

(10) Patent No.: US 10,904,258 B2
(45) Date of Patent: Jan. 26, 2021

(54) INTELLIGENT CLUSTER LEARNING IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Shikhar Kwatra, Morrisville, NC (US); Christopher J. Hardee, Raleigh, NC (US); Scott E. Schneider, Rolesville, NC (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

(21) Appl. No.: 16/284,249

(22) Filed: Feb. 25, 2019

(65) Prior Publication Data
US 2020/0274877 A1    Aug. 27, 2020

(51) Int. Cl.
| | |
|---|---|
| *G06F 15/173* | (2006.01) |
| *H04L 29/06* | (2006.01) |
| *H04L 29/08* | (2006.01) |
| *H04L 12/24* | (2006.01) |
| *H04L 12/26* | (2006.01) |
| *G06N 20/00* | (2019.01) |

(52) U.S. Cl.
CPC .......... *H04L 63/102* (2013.01); *G06N 20/00* (2019.01); *H04L 41/16* (2013.01); *H04L 43/04* (2013.01); *H04L 67/22* (2013.01); *H04L 67/306* (2013.01)

(58) Field of Classification Search
CPC ......... H04L 67/10; H04L 67/12; H04L 43/10; H04W 4/70
See application file for complete search history.

(56) References Cited

U.S. PATENT DOCUMENTS

| | | | |
|---|---|---|---|
| 9,372,922 B2 * | 6/2016 | Shaashua | G06N 7/005 |
| 9,774,507 B2 | 9/2017 | Britt et al. | |
| 2014/0200463 A1 | 7/2014 | el Kaliouby et al. | |
| 2015/0135277 A1 | 5/2015 | Vij et al. | |
| 2016/0359864 A1 | 12/2016 | Dhaliwal et al. | |
| 2017/0142576 A1 | 5/2017 | Greaves et al. | |
| 2017/0149928 A1 | 5/2017 | George et al. | |
| 2019/0108353 A1 * | 4/2019 | Sadeh | G06F 21/604 |

OTHER PUBLICATIONS

Arias et al., "Privacy and Security in Internet of Things and Wearable Devices," IEEE Transactions on Multi-Scale Computing Systems, vol. 1, No. 2, Apr.-Jun. 2015 (11 pages).

* cited by examiner

*Primary Examiner* — Yves Dalencourt
(74) *Attorney, Agent, or Firm* — Griffiths & Seaton PLLC; Kurt Goudy

(57) ABSTRACT

Embodiments for intelligent cluster learning in an Internet of Things (IoT) computing environment by a processor. One or more interactive actions, engagements, behaviors, communications, biometric data, parameters, or combination thereof relating to one or more IoT devices may be analyzed. A user profile may be clustered into a cluster of profiles according to the one or more interactive actions, engagements, behaviors, communications, biometric data, parameters, or combination thereof using one or more machine learning operations. Access to one or more functional assets and parameters associated with the one or more IoT devices may be automatically enabled or disabled.

20 Claims, 7 Drawing Sheets

INTELLIGENT CLUSTER LEARNING IN AN INTERNET OF THINGS (IOT) COMPUTING ENVIRONMENT

BACKGROUND OF THE INVENTION

Field of the Invention

The present invention relates in general to computing systems, and more particularly, to various embodiments for intelligent cluster learning in an Internet of Things (IoT) computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products for assisting in improvements to the quality of life and appropriate living accommodations.

SUMMARY OF THE INVENTION

Various embodiments for intelligent cluster learning in an Internet of Things (IoT) computing environment by a processor, are provided. In one embodiment, by way of example only, a method for intelligent cluster learning in an Internet of Things (IoT) computing environment, again by a processor, is provided. Interactive actions, engagements, behaviors, communications, biometric data, parameters, or combination thereof relating to one or more IoT devices may be analyzed. A user profile may be clustered into a cluster of profiles according to the interactive actions, engagements, behaviors, communications, biometric data, parameters, or combination thereof using one or more machine learning operations. Access to one or more functional assets and parameters associated with the one or more IoT devices may be automatically enabled or disabled.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
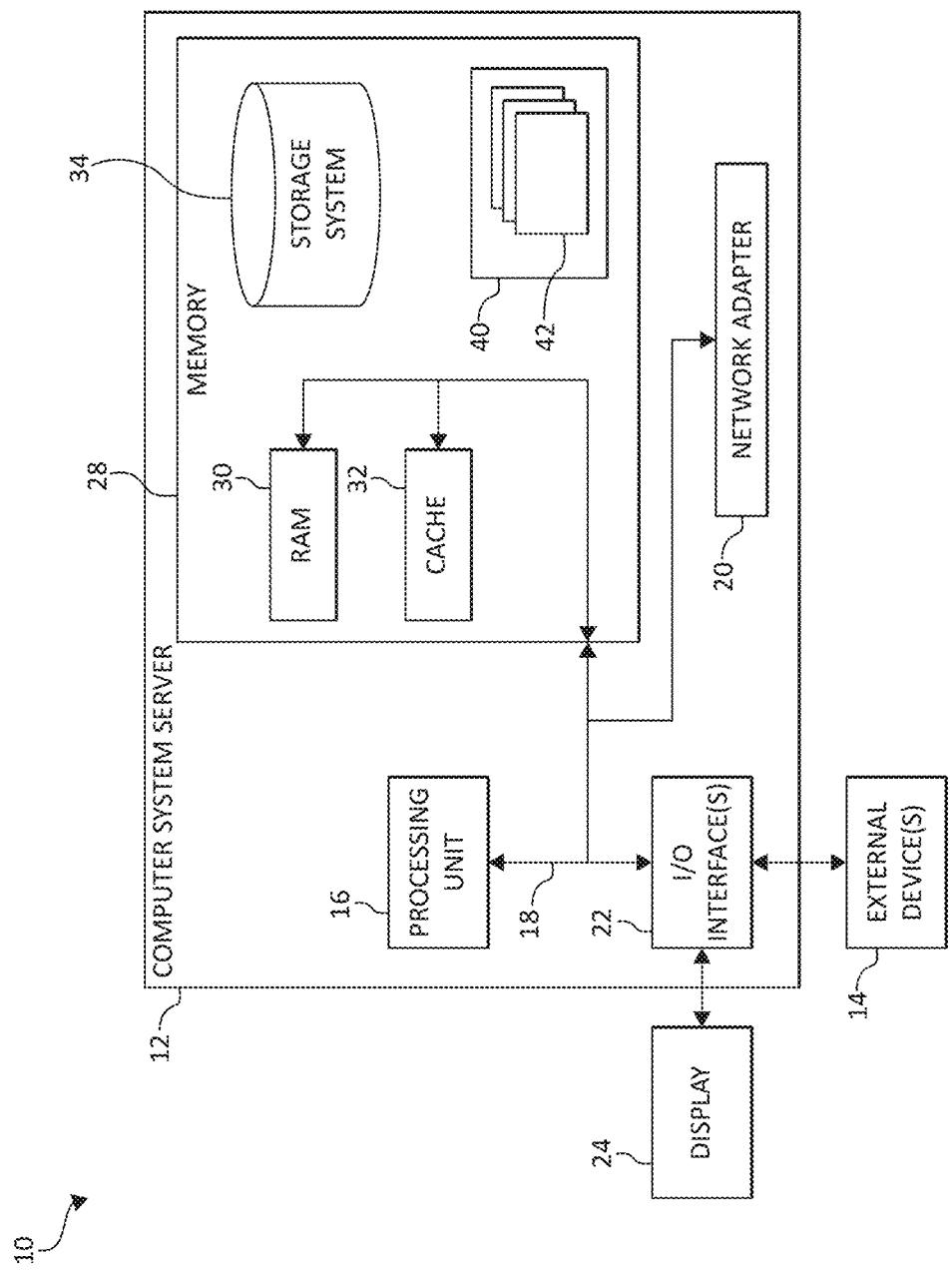
FIG. 1 is a block diagram depicting an exemplary cloud computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, when a user and/or group of users (e.g., a person or family) desires to create user profiles for one or more of the group of users while using, entering, engaging, and/or purchasing a security enabled structure (e.g., house) and/or equipment, users are required to register and create an account and/or have a personalized dashboard. Moreover, each member may be required to be associated with an application for accessing the dashboard after creating a profile. As such, the excessive use of time and computing resource results in computing inefficiency while creating user profiles. Moreover, larger groups with more members will have more difficulty in creating profiles so as to run and configure sensor devices in order to satisfy the needs of the group for the "smart home." Thus, a need exists for intelligent cognitive cluster learning in an Internet of Things (IoT) computing environment using a computing processor.

Accordingly, the present invention provides for an intelligent mechanism to recognize a group of users (e.g., members of the family) and automatically create user profiles and a cluster of the user profiles using a machine learning operation and provide customized services of one or more IoT devices and/or objections associated with the IoT devices to one or more of the user associated with the group of users thereby eliminating wasted time, effort, and computing resources. The IoT devices may include, for example, a smart door that may be unlocked or locked. The IoT devices may be associated with one or more products and subsystems within a home or commercial building, such as lighting systems, security systems, various sensors, and multiple external terminals. The IoT devices may allow for one or more inputs/commands from a variety of means such as touchscreens, voice recognition systems, telephones, cameras, wearable sensor devices, custom switches or any device capable of providing an input to a computer system.

In one aspect, mechanisms of the illustrated embodiments provide for cognitive cluster learning in a computing environment. One or more interactive actions, engagements, behaviors, communications, biometric data, parameters, or combination thereof relating to one or more IoT devices may be analyzed. A user profile may be clustered into a cluster of profiles according to the one or more interactive actions, engagements, behaviors, communications, biometric data, parameters, or combination thereof using one or more machine learning operations. Access to one or more functional assets and parameters associated with the one or more IoT devices may be automatically enabled or disabled.

In an additional aspect, the intelligent cognitive cluster learning mechanism provides for understanding a user's cognitive state along with a confidence level for cognitive clustering in an IoT computing environment. Data associated with a user's interaction, engagement pattern, sequence, facial expression may be analyzed in (e.g., in real-time) using inputs received from one or more IoT devices such as, for example, a camera, sensor, or other wearable IoT device (e.g., front camera of the user smartphone, smartwatch, or nearby camera associated with a structure, etc.). Each of the activities associated with the user may be cognitively analyzed. The activities may include, for example, one or more conversations and operations for control of one or more IoT devices and/or objects associated with an IoT device associated with a structure (e.g., air conditioning (AC) units, remote controls, gas, electrical power, thermostat, or other object in a home). Multiple user profiles (e.g., family member profiles) may be dynamically clustered together using one or more machine learning operations. Access to the functional assets and parameters of the objects and/or IoT devices may be automatically allowed or restricted (e.g., partial or complete access or restriction). In one aspect, a dashboard may be cognitively created. Thus, in one aspect, the allowing or restricting the functional assets and parameters of the objects and/or IoT devices may be automatically provided without requiring manual creation of a profile dashboard.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
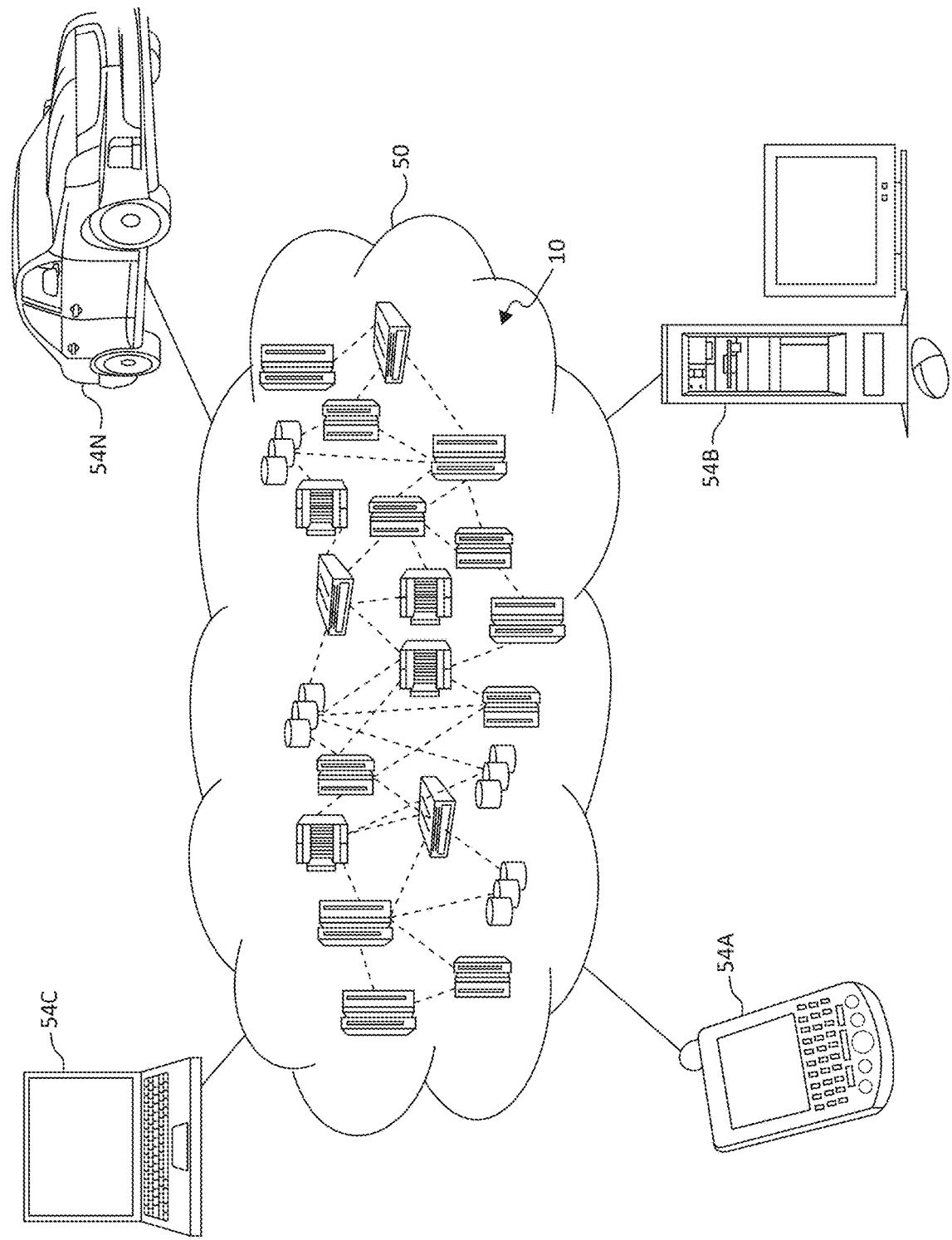
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
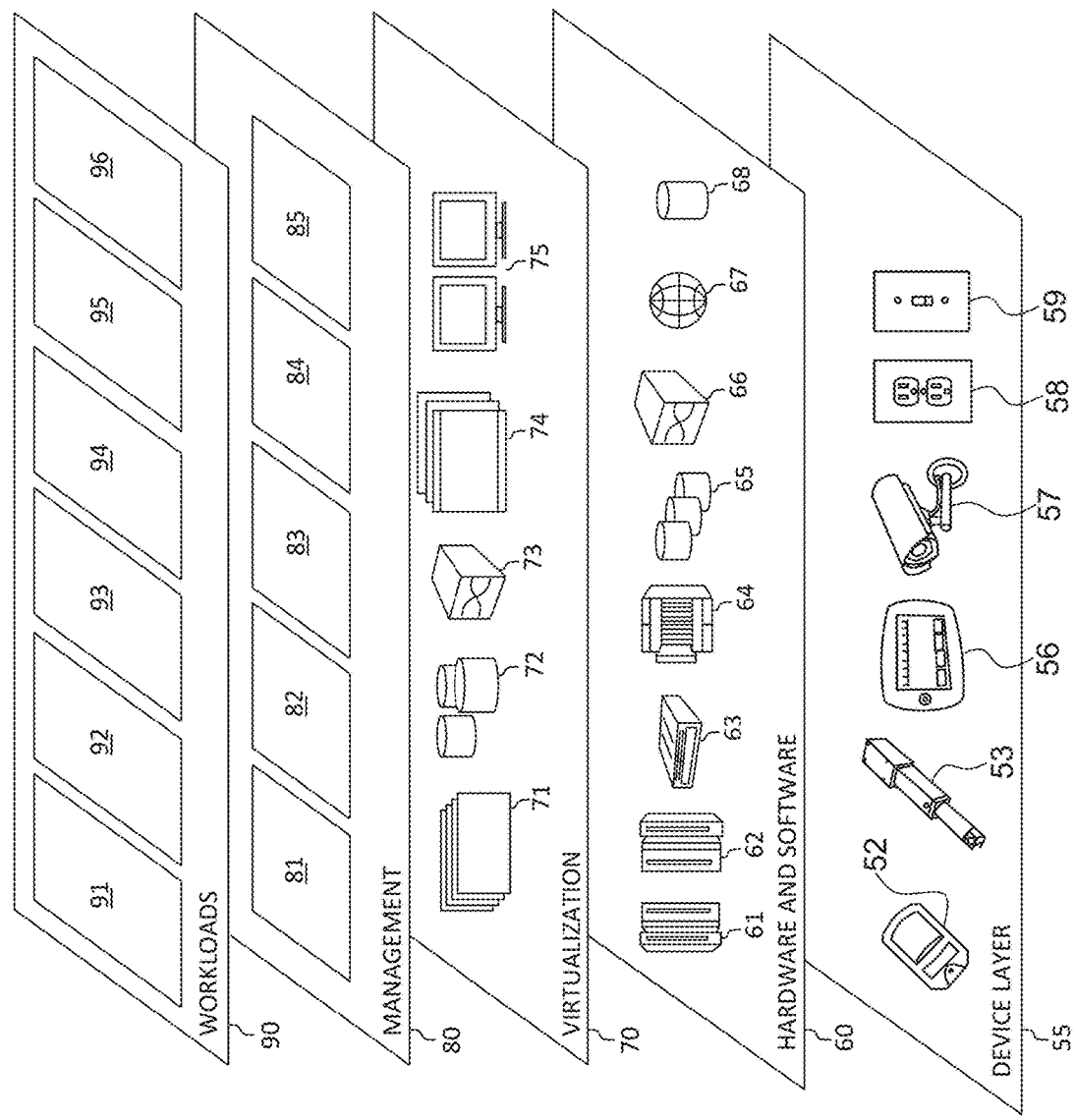
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitive cluster learning in an IoT computing environment. In addition, workloads and functions 96 for cognitive cluster learning in an IoT computing environment may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for cognitive cluster learning in an IoT computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
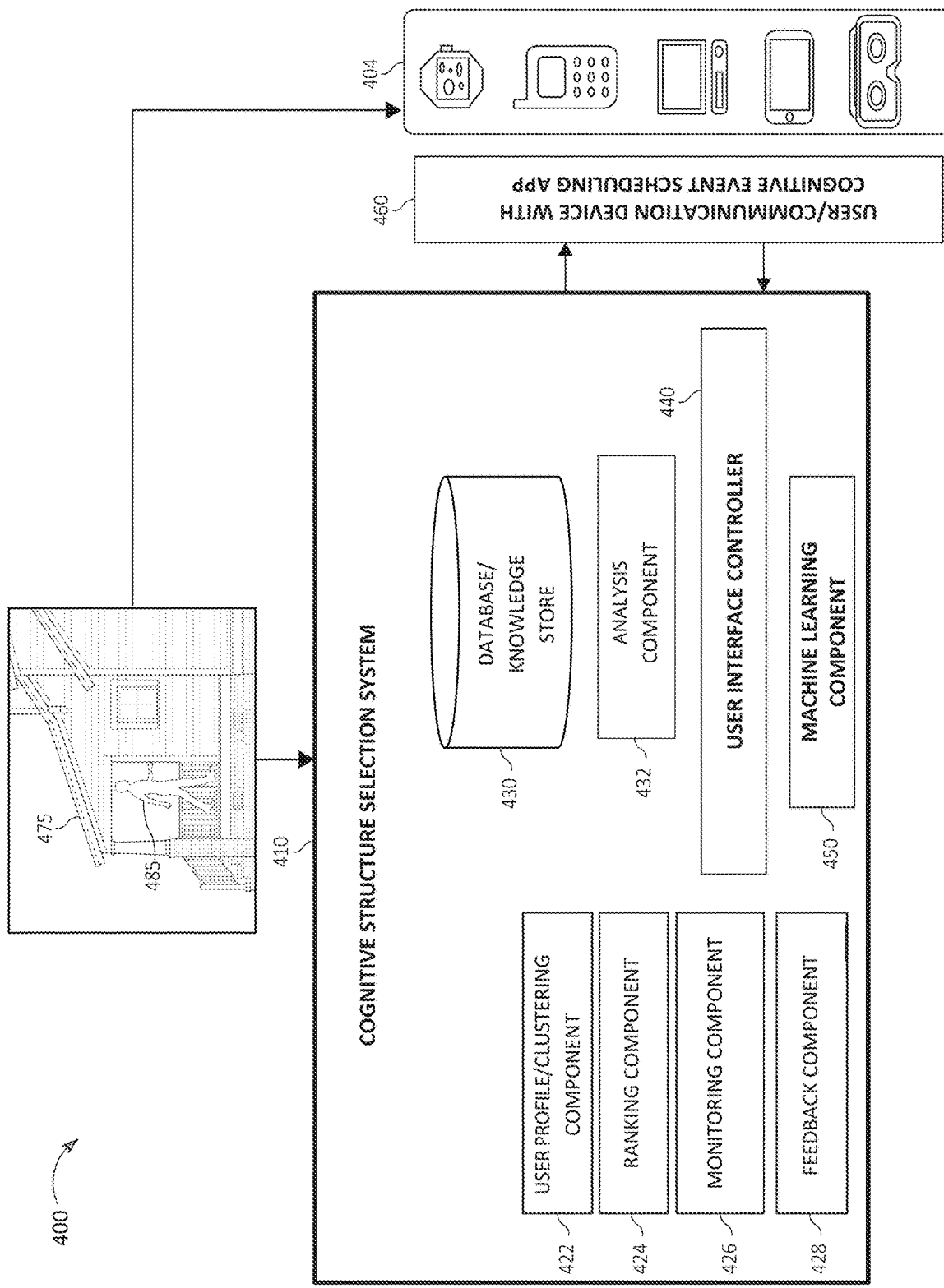
FIG. 4 is an additional block diagram depicting an exemplary functional relationship between various aspects of the present invention.

Turning now to FIG. 4, a block diagram depicting exemplary functional components of system 400 according to various mechanisms of the illustrated embodiments is shown. FIG. 4 illustrates intelligent scheduling of events in a computing environment, such as a cognitive cluster learning system 410 that may be included in a computing environment, according to an example of the present technology. As will be seen, many of the functional blocks may also be considered "modules" or "components" of functionality, in the same descriptive sense as has been previously described in FIGS. 1-3. For example, computer system/server 12 of FIG. 1 may be included in FIG. 4 and may be connected to other computing nodes and/or one or more Internet of Things (IoT) devices over a distributed computing network, where additional data collection, processing, analytics, and other functionality may be realized.

The functional components of system 400 may include computer system/server 12 of FIG. 1 that may include the cognitive cluster learning system 410 in order to collect, analyze, and process text data, images, video data, audio data, sensor data, or a combination thereof collected from the various computing devices and/or sensors. With the foregoing in mind, the module/component blocks 400 may also be incorporated into various hardware and software components of a system for intelligent scheduling of events in accordance with the present invention. Many of the functional blocks 400 may execute as background processes on various components, either in distributed computing components, or on the user device, or elsewhere.

The system 400 may include the computing environment such as, for example, a cognitive cluster learning system 410, user equipment(s) ("UE") 404 (e.g., one or more communication having a cognitive cluster learning applications 460 installed thereon), such as a desktop computer, laptop computer, tablet, wireless communication device (e.g., a smartphone), vehicular communication system, or on-board navigation system, and/or another electronic device that may have one or more processors and memory (e.g., computing devices 54A-N as described in FIG. 2). The cognitive cluster learning system 410 and the UEs 404 may each be associated with and/or in communication with each other by one or more communication methods, such as a computing network.

In one aspect, the cognitive cluster learning system 410 may be included in a computing system that provides virtualized computing services (i.e., virtualized computing, virtualized storage, virtualized networking, etc.) to UEs 404. More specifically, the cognitive cluster learning system 410 may be included in a computing system that provides virtualized computing, virtualized storage, virtualized networking and other virtualized services that are executing on a hardware substrate.

As depicted in FIG. 4, the cognitive cluster learning system 410 may include a user profile/clustering component 422, a ranking component 424, a monitoring component 426, a feedback component 428, a database/knowledge store 430, an analysis component 432, a user interface ("UP") controller 440, and/or a machine learning component 450. The cognitive cluster learning system 410 may also be associated with a structure 475 (e.g., a house or commercial building) and/or one or more users such as, for example, user 485.

In one aspect, the cognitive cluster learning system 410, in association with the analysis component 432, may collect, receive, and/or analyze data relating to one or more interactive actions, engagements, behaviors, communications, biometric data, parameters, a cognitive state of a user, and/or combination thereof relating from one or more IoT devices such as, for example, UEs 404. The collected data may be received via the UI controller 440 and stored in the database/knowledge store 430. For example, the UEs 404 that are associated with the user 485 and/or structure 475 may gather and/or collect data relating to the user 485. The IoT device data may be gathered to determine, via machine learning component 450, interactive actions, engagements, behaviors, communications, biometric data, parameters, a cognitive or emotional state, mood, stress level, facial expression, speech patterns, voice tone, and/or body language of a user associated with an object and/or UEs 404.

It should be noted that the database/knowledge store 430 may also work in conjunction with the user profile/clustering component 422 and/or analysis component 432 to store, record, and/or maintain user profiles, clusters of profiles, and/or one or more interactive actions, engagements, behaviors, communications, biometric data, parameters, cognitive or emotional state, mood, stress level, facial expression, speech patterns, voice tone, and/or body language of a user associated with an object and/or UEs 404.

The database 430 may track, identify, and associate all communication threads, messages, transcripts, and the like of all data generated during all stages of the development or "life cycle" of the user profiles, one or more interactive actions, engagements, behaviors, communications, biometric data, parameters, cognitive or emotional state, mood, stress level, facial expression, speech patterns, voice tone, and/or body language of a user associated with an object and/or device 404.

The monitoring component 426 may be employed to monitor the structure 475 and/or user 485. Thus, the monitoring component 426 may continuously monitor, observe, and assist the analysis component 432 with analyzing each of the various actions, engagements, behaviors, communications, biometric data, parameters, cognitive or emotional state, mood, stress level, facial expression, speech patterns, voice tone, and/or body language of a user 485 associated with an object and/or on or more UEs 404.

In one aspect, one or more UEs 404 may be included in the cognitive cluster learning system 410. Alternatively, one or more of the UEs 404 may be external to, and in communication with, the cognitive cluster learning system 410. For example, UEs 404 may include an integrated camera scanner for recognizing one or more user such as, for example, user 485 entering and/or exiting the structure 475 (e.g., house, apartment, commercial building, etc.). One or more UEs 404 may be an infrared ("IR") sensor component located within and/or external to the structure 475 so as to activate one or more cameras for exiting of a sleep timer or sleep mode and using a facial recognition operation on the user 485 entering the structure 475.

In one aspect, as previously stated, the computer system/server 12 of FIG. 1 may be included in system 400. Thus, the computer system/server 12 of FIG. 1 may include a multimedia access processor (MAP), which may also be integrated with one or more UEs 404 (e.g., the camera scanner) in order to take into account, users entering the structure 475 and also for creating a temporary user profile in the cloud network of every new person that enters the house, The UI component controller 440 and/or one or more UEs 404 may also include a wireless component (e.g., a wireless ZigBee® module) for enabling an interaction between one of the UEs 404 (e.g., a router IR sensor) and a coordinator MAP network for polling a main processor such as, for example, computer system/server 12 of FIG. 1 to add profiles to database/knowledge store 430.

That is, one or more input parameters from UEs 404 may be provided or communicated to the cognitive cluster learning system 410 via the UI controller 440 and stored in the database/knowledge store 430. The machine learning component 450 may learn and understand a cognitive state of the user with respect to the applications being used according to, for example: 1) an emotional mood and cognitive state of the user (monitored using wearables/cameras and related devices), 2) a selected time period (e.g., a time of the day), 3) a schedule/calendar activity of each user, 4) monitored communications (e.g., conversations, emails, text messages, emails, etc.), 5) geo-spatial metrics (e.g., a location), and/or 6) object monitoring in a selected structure (e.g., house, apartment, commercial building, etc.).

For example, the analysis component 432 may analyze a cognitive state (e.g., a person's psychological state) or health state of the user. That is, the cognitive or health state may be the well-being (e.g., subjective well-being "SWB", emotional well-being, mental well-being, physical well-being, or an overall well-being) of the user. The analysis component 432 may analyze an emotional state of the user, biometric data, behavior patterns, a health profile of the user, or a combination thereof. In one aspect, well-being may be generally described as a normal/standardized or satisfactory condition of existence of the user or a state characterized by health, happiness, emotional stability, mental stability, physical stability, or success. As one of ordinary skill in the art will appreciate, "well-being" may be dependent on a number of factors, including such factors as medical condition, emotional stability, mental stability, physical stability, financial stability, a degree or level of happiness, or other factors that may be learned.

The user profile/clustering component 422 may dynamically create one or more user profiles. The user profile/clustering component 422 may also cluster the user profiles into a cluster of profiles according to the one or more interactive actions, engagements, behaviors, communications, biometric data, parameters, or combination thereof using one or more machine learning operations from the machine learning component 450. The user profile/clustering component 422 may also enable or restrict access to one or more functional assets and parameters associated with the one or more IoT UEs 404 may be automatically enabled or disabled.

In an additional aspect, the user profile/clustering component 422 may dynamically create the cluster of profiles according to collected feedback and assigned weights associated with the interactive actions, engagements, behaviors, communications, biometric data, parameters, or combination thereof. The user profile/clustering component 422 may assign the user profile to the cluster of the profiles upon a confidence level exceeding a selected threshold.

The user profile/clustering component 422 may automatically create a dashboard h the cluster of profiles. Also, each user profile may be temporarily created and/or stored in the database/knowledge store 430 for a selected period of time in the cluster of profiles associated with a dashboard.

The dashboard may be provided to a user 485 via a graphical user interface ("GUI") of one or more UEs 404 that enables a user (e.g., user 485) access to the one or more functional assets and parameters associated with the one or more IoT UEs 404 or objects associated with structure 475 and/or UEs 404.

Returning again to the machine learning component 450, the interactive actions, engagements, behaviors, communications, biometric data, parameters, a cognitive state of each user may be monitored and learned. The machine learning component 450 may use the database/knowledge store 430 that may include a knowledge domain relating to a user profile and/or information about the person's activities, behaviors, cognitive or health state, and even activities of daily living (ADL), and context of daily living (CDL). The machine learning component 450 may validate and adjust the collected data of a user by observing repeated emotion moods, one or more stimuli, atmospheric data, environmental data, physical gestures of one or more user, various types of emotions and stimuli that produces the emptions, speech patterns, facial gestures, facial expressions, biological data, voice inflections and tones, an interactions detected between the user and a service, product, object, and/or UEs 404 that may be associated with the structure 475 and/or user 485.

The machine learning component 450 may also use one or more machine learning operations such as, for example, an instance of IBM® Watson® such as Watson® Analytics (IBM® and Watson® are trademarks of International Business Machines Corporation). That is, cognitive reasoning, analytics and/or artificial intelligence (AI) may be used to recognize intent, understand a meaning of the user, search known information about the intended user (e.g., occupants of a structure) and/or use historical data about a user or group of users.

The ranking component 424 may determine a confidence level indicating an accuracy level of the user profile. The conference level of the user profile may be increased according to a type of IoT device and/or object used by a user, a selected amount of time, or a combination thereof. The ranking component 424 may rank the one or more parameters or values to assist with determining the confidence level. That is, the ranking component 424 may assign a weighted value to one or more parameters or values. The confidence level may be determined according to each of the weighted values.

The feedback component 428 may collect feedback information of the one or more users relating to the actions, engagements, behaviors, communications, biometric data, parameters, cognitive or health state, and/or the confidence levels. In one aspect, the machine learning component 450, in association with the feedback component 428, may collect user feedback (e.g., from UEs 404) as part of determining a confidence level, analyzing data, and/or creating user profiles, clustering the profiles, and/or providing a personalized dashboard.

In one aspect, the database/knowledge store 430 may be a knowledge domain and/or an ontology of concepts representing a domain of knowledge. For example, the database/knowledge store 430 may parse through a knowledge domain having an ontology of activities of a user, psychophysical responses and behaviors according to one or more stimuli, atmospheric data, environmental data, physical gestures of a user, various types of emotions and stimuli that produces the emptions, speech patterns, facial gestures, facial expressions, biological data, voice inflections and tones, an interaction detected between a user and an object/IoT device in the IoT network.

A thesaurus or ontology may be used as the domain knowledge of the database/knowledge store 430 and may also be used to identify relationships between observed and/or unobserved variables parameters. In one aspect, the term "domain" is a term intended to have its ordinary meaning. In addition, the term "domain" may include an area of expertise for a system or a collection of material, information, content and/or other resources related to a particular subject or subjects. For example, a domain can refer to physical phenomena, atmospheric, biological, physiological, environmental, scientific, industrial, educational, statistical data, medical, commercial, health, manufacturer information, biomedical-specific information, one or more stimuli and response types in a variety of applications, physical gestures of the customer, various types of emotions and stimuli that produces the various emptions, speech patterns, facial gestures, facial expressions, biological data, voice inflections and tones, an interaction detected between the customer and a service, product, or person. A domain can refer to information related to any particular subject matter or a combination of selected subjects.

The feedback component 428 may be used to collect feedback information from the user 485 and/or structure 475 in association with the one or more UE's 404. Also, the feedback component 428 may provide collected feedback to the machine learning component 450.

In one aspect, the machine learning component 450 may include machine learning modeling and/or operations that may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state-space models, which may be completed by unsupervised learning techniques, particularly to learn the context and/or the indicators. Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the cognitive cluster learning system 410 may perform one or more calculations for cognitive structure selection according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

With the foregoing functional components 400 in view, consider the following example. In one aspect, as a user enters a structure, a temporary use profile may be created. An initial confidence level may be assigned and/or determined for a user. In one aspect, those users who entered the structure for the first time during installation may be considered a first group of users with an assigned and/or default confidence level such as, for example, a confidence level of 0%, as soon as a user profile is created. Optionally, a selected administrator and/or machine learning operation may assign and/or identify a threshold of confidence (e.g., a selected threshold) in order to consider the person as a "member" of the cluster. For example, if the cognitive cluster learning system is at least 50% sure of confidence and the confidence threshold is assigned as at least 40%, an additional user may be added to the group of users.

The cognitive cluster learning system may learn, track, monitor, and/or analyze one or more parameters. A parametric relationship is established and computed each time a user enters the structure and the temporary profile is added to the database along with identification data (e.g., biometric data such as, for example, facial recognition data, a user name, and/or a counter added in the database).

A parametric relationship means that an output depends on crucial parameters as described herein (e.g., the output forms a parametric relationship such as, for example, a number of times a user visited location "X," an amount of time user remained in the house at time T1). The parameters may include, but not limited to, the following. 1) A number of times a respective user visited (e.g., entered/existed) a structured during a selected time period. 2) An amount of time the user remained inside the structure. 3) One or more items/appliances used by the user. It should be note that a confidence level may exponentially be increased for use by the user of a selected appliance (e.g., a kitchen appliance such as, for example, a refrigerator, microwave, dishwasher, etc.). 4) Parameters may also include items/objects that are categorized as generic or specific appliances pertaining to a specific function, task, or workload associated with the structure. It should be noted that a confidence level may linearly increase according to the usage of generic items/objects used (e.g., use of a sink in a restroom or playing an audio or video device such as, for example, radio or television).

In one aspect, a confidence level may increase exponentially after a specific duration of number of hours (e.g., after 3 hours). The confidence level of the person being a member of group (e.g., a member of a family) may be increased by twice an initial base or default value).

As soon as the user leaves and/or exits the structure, the profile may remain in an account or database for a temporary stage of a selected amount of time (e.g., 48 hours) in a buffer. If the same user does not return/enter the structure during the selected amount of time, the user profile may be buffered and/or cached in an encrypted guest category so as to remove the use profile from the cluster of member profiles and/or removed from a main or primary dashboard account profile.

In an additional aspect, those users adjusting one or more IoT devices or objects (e.g., a user changing a thermostat, modifying the demographics of the room detected from the camera scanner, etc.) may be assigned or determined to have a confidence level greater than the selected threshold. For example, the cognitive cluster learning system may detect a perspiration level of those user profiles, having a confidence level greater than the selected threshold, and humidity levels of the surroundings in the structure. The cognitive cluster learning system may enable one or more sensor devices to adjust in order to create a cool environment for those users having the confidence level greater than the selected threshold. Hence, depending upon the confidence level created for each user, a personalized dashboard may be developed automatically based on the cluster of members and the adjustments to one or more objects, sensors, and/or IoT devices associated with a structure may be set, updated, adjusted, and/or turned on/off according to one or more user preferences of the cluster of user.

Following a defined period of time, continuous learning and/or feedback of each user of the cluster of users enables fine tuning and adjustments and an IoT device (e.g., a camera scanner) may recognize which member of the cluster (e.g., family member) entered the structure and thereby adjust the surroundings, accordingly suitable to the needs of every member of the cluster.

If multiple users are living or present in the structure at the same time/instance, the IoT devices (e.g., cameras) installed in respective areas of the structure along with other sensors may monitor and/or detect the presence of a user and adjust one or more objects or IoT devices depending upon use of specific rooms in the structure by each of the users.

Alternatively, other methods for presence detection and identity of the user may be used. If multiple users are simultaneously present in the same room, a machine leaning based confidence level model, which has been trained, may be adjusted according to a primary user of the house for adjusting the one or more objects or IoT devices depending for the detected primary user (e.g., a user having a primary status and/or a confidence level score greater than other users). Also, an averaging operation may be performed based on the cumulative needs of the users in the room. In one aspect, the averaging operation means any kind of normalization that can be performed considering all the input parameters and any anomalies that may exist (e.g., a construction worker came to perform a job/work, but this does not mean the worker is a member of the house) and one or more normalization techniques may be able to adjust the parameters accordingly.

In one aspect, the present invention applies to a variety of "smart home" applications and may be applied to a variety of IoT operations such as, for example, regulation of room temperature in a house, maintaining or controlling a television and/or lighting, enabling the security doors (e.g., lock/unlock), and a variety of other applications and operation of objects and IoT devices. For example, once the confidence level has been established as to whether a user at the door of a home is included in the cluster of user (e.g., a family member), the user may be recognized as a member of one or more clusters and allowed to enter the door of the structure by using an auto-unlock feature installed on a door of a house, which is a part of the cognitive system of the house infrastructure.

Also, a super-user (e.g., a head of house, a primary person living in a home such as a parent) may define one or more parameters for a hierarchy-based system for recognizing a user profile as a member of a cluster of profiles (e.g., family profile) as compared to a guest profile. Thus, the hierarchy-based system may recognize a user profile as a member of a cluster of profiles (e.g., family profile) as compared to a guest profile. For example, user "A" of a cluster of user (e.g., a teenager of a family) may allow the access to user "B" (e.g., a friend) entering the house. However, if user "B" is deemed to be unsafe to be entering the house according to the super-user when the super-user is not at home, user A's (e.g., child's) request to open the door may first be sent to the super user in order to enable/disable that particular task.

It should be noted that when there are a number of unknown user in a group, the behaviors and actions from the group can be stored in a group profile that can be used when other groups are present in the future. For instance, the actions taken by a smart home when a host is having a party can train the system regardless of whether the same exact persons are present each time (e.g., at each party). The present invention may also be spread, shared, and/or made available across multiple structure locations. For example, the profiles from a home environment (e.g., primary residence) can be used at another home environment (e.g., a secondary residence) (e.g., user "X" and user "Y" may have two houses and may maintain the cluster identification).

Also, one or more social media networks may be used to identify one or more possible and/or potential relationships between users/clusters of user, which information may be used when two new clusters come in contact with one another.

Figure 5:
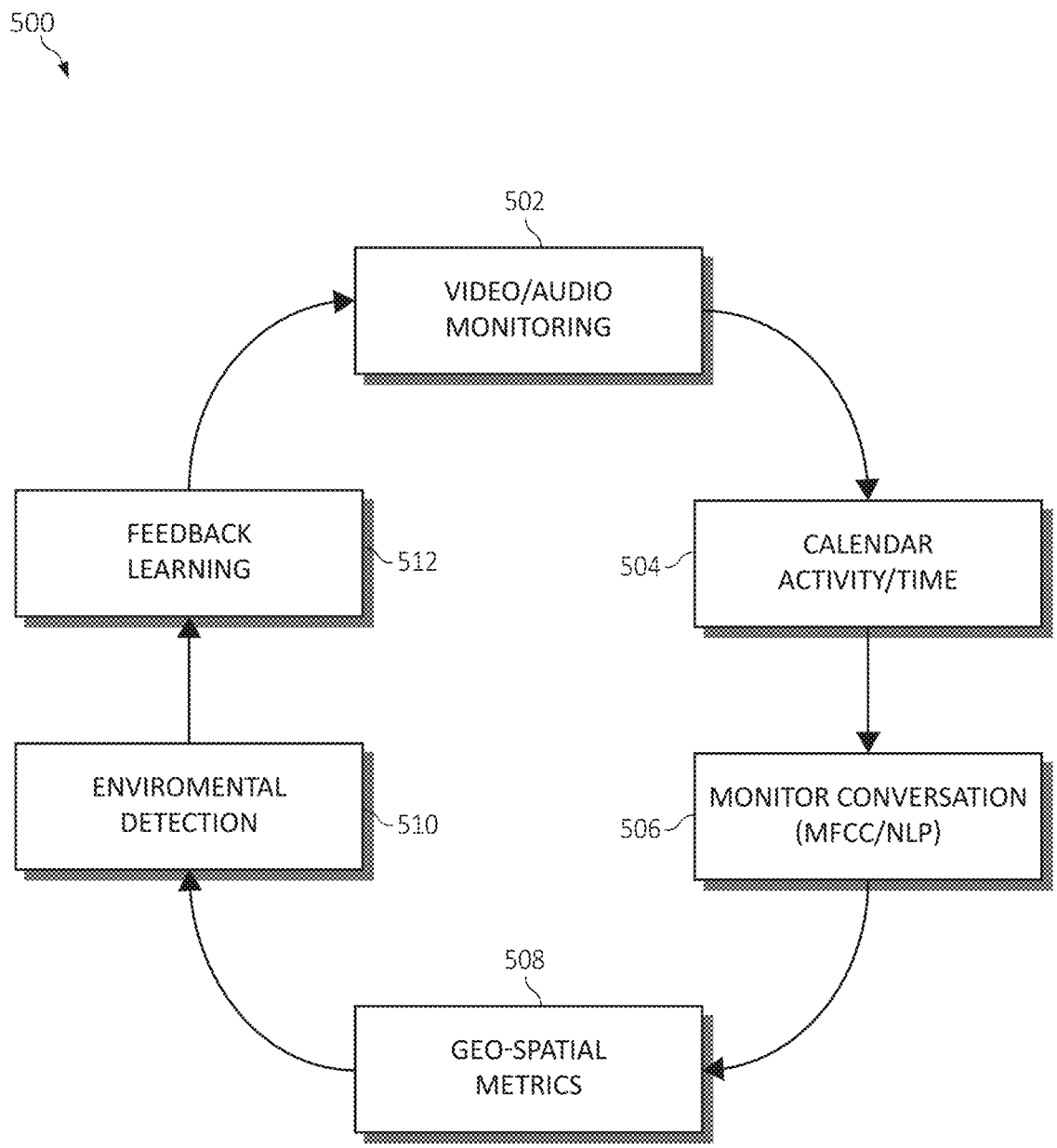
FIG. 5 is a block-flow diagram depicting an exemplary method for cognitive cluster learning in a computing environment by a processor, again in which aspects of the present invention may be realized.

Turning now to FIG. 5, a block diagram of exemplary functionality 500 relating to cognitive cluster learning in a computing environment. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere.

Starting with block 502, video/audio devices of an IoT computing environment may be modified. Calendar activities and schedules (e.g., time) may be determined, collected, and/or analyzed, as in block 504. One or more communications (e.g., a conversation of one or more users) may be monitored using Mel-Frequency Cepstral Coefficients ("MFCC") and/or natural language processing "NLP," as in block 506. Geo-spatial metrics (e.g., location of a user) may be analyzed, identified, and/or determined, as in block 508. The geo-spatial metrics may be input parameters used as input into the multi-layer machine learning operations to establish a confidence level or "relevance" factor or rigidity factor. In block 510, one or more environmental factors may be identified and/or detected (e.g., environment detection). In block 512, a feedback learning operation may be performed using data for a user and/or data from blocks 502-510.

Figure 6:
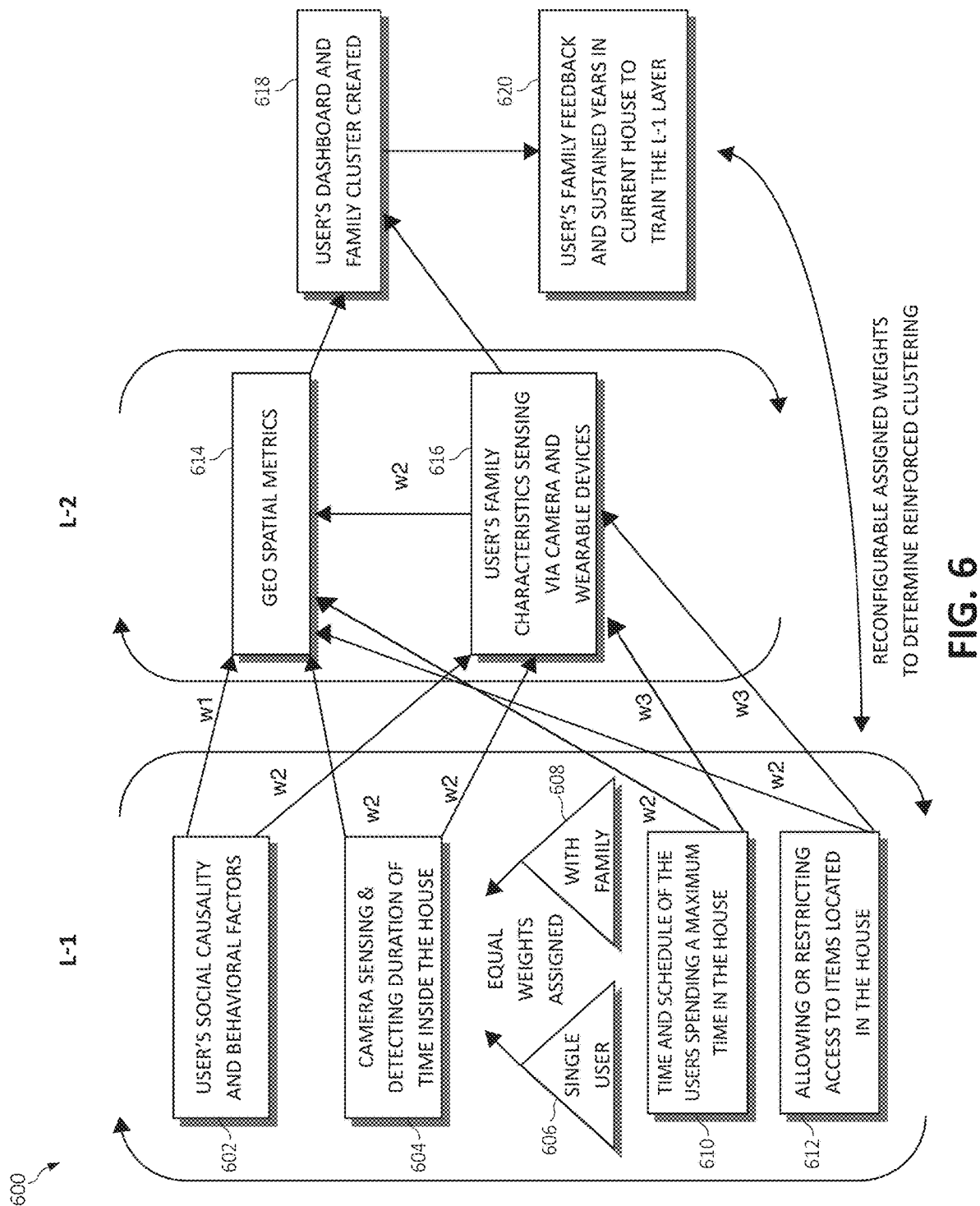
FIG. 6 is a block-flow diagram depicting an additional exemplary method for cognitive cluster learning in a computing environment by a processor, again in which aspects of the present invention may be realized.

Turning now to FIG. 6, a block diagram of exemplary functionality 600 relating to cognitive cluster learning in a computing environment. One or more features, functionality, components, and/or operations of FIGS. 1-5 may be included in FIG. 6. FIG. 6 depicts a multi-layer neural network model or supervised machine learning model, for instance, logistic regression model with regularization used in order to understand and classify a relative or cognitive state of a user and activity of the user in conjunction with a selected time of occupying a selected structure.

As depicted in FIG. 6, three (3) layers (e.g., L-1, L-2, and L-3) depict an end-to-end neural network classification model for storing user's cognitive state and dynamically creating a cluster of members with reinforced feedback in conjunction with re-configurable neural weights assigned to the parameters based on the preferences assigned to the monitoring engine in order to take an informed decision and create the clustering profile.

It should be noted that w1, w2, and w3 illustrated in FIG. 6, are re-configurable weights which are re-computed and trained over time. That is, w1, w2, and w3 may be variable weights which are trained over time to minimize the error and find an optimal solution. Also, Arrows need to be pointing from all the inputs to all the blocks in layer 2, then all blocks in layer 2 to next layer.

In one aspect, in block 602, one or more social causality and behavioral factors (e.g., social media factors and previous area data) may be in a first level ("L-1") and assigned a weighted value such as, for example, w1 in relation to block 614 and w2 in relation to block 616. In block 604, a camera may sense and detect a presence of a user during period of time, for example, w2 in relation to block 614 and w2 in relation to block 616. Block 606 depicts a single user and block 608 illustrates a family or "group" and both the single user and/or use with familial associates be assigned equal weights for block 604. In block 610, a time and schedule of a one or more user spending a maximum amount of time in the house, may have also a determined or assigned weighted value such as, for example, w3 in relation to block 616 and w2 in relation to block 614. In block 612, access to one or more items/objects, located in the structure, may be allowed or restricted such as, for example, w3 in relation to block 616 and w2 in relation to block 614.

Turning now to level 2 ("L-2"), block 614 may provide a geographical location factor (e.g., geo-spatial metrics) and may collect one or more weighted values from one or more factors from L-1. Similarly, block 616 may illustrate a user's family characteristics (e.g., characteristics of a cluster of users) via one or more IoT devices (e.g., a camera and/or wearable device) and may collect one or more weighted values from one or more factors from L-1. Using the combined values from L-1, block 616 may also generate and determine a weighted value for the block 614 such as, for example, w2. From block 614, the weighted values may be used to provide a user's dashboard and create a cluster of users (e.g., a family cluster) for the user, as in block 618. User feedback may be collected over a selected and/or sustained period of time (e.g., a year) with the feedback being used to train one or more levels (e.g., feedback sustained for one or more years in the current structure/house to train L-1 layer), as in block 620.

With the foregoing functional components 400-600 in view, consider the following algorithmic example for cognitive cluster learning. In one aspect, for each user $U_i$ in a current detected list of users U, $U_i$ characteristics may be collected and/or received such as, for example a tone t, personality p, language expression l, facial gestures f, body gesture g/action b, (e.g., $U_i$ (t, l, f, g, b). $U_i$ (t, l, f, g, b) is analyzed to determine a cognitive state (cs) and behavior (be). If $U_i$ (cs,be) exceeds or surpass an initial threshold time $T_w$, a monitoring session is started for $U_i$ and additional users. For each user $U_i$'s history record (H) (e.g., $(U_{i_{Hi}})$ in $U_{i_H}$, if $U_{i_{Hi}}$ contains an old user cognitive state behavior and time in the house $U_i$ (cs,be) that triggered a feedback to the cognitive cluster learning that is similar to the current $U_i$ (cs,be, then a cluster monitoring session is started for $U_i$ and additional users.

The $U_i$ and additional users may be continuously monitored so as to collect and/or receive updated or new $U_i$ characteristics such as, for example a tone t, personality p, language expression l, facial gestures f, body gesture g/action b, (e.g., $U_i$ (t, l, f, g, b). A determination operation is performed to determine if there are any changes to the $U_i$ characteristics and/or components of the house. A $U_i$ reaction to one or more changes may be determined. Each clustering action, $P_{Ai}$, may contain a set of machine comprehensible actions, a duration, a prioritization, and a set of user cognitive states and behaviors $U_x$ (cs,be) for which the $P_{Ai}$, is recommended. The prioritization in the $P_{Ai}$, may be used to set the order of clustering action in which minimize affectation to user usage (e.g., prioritization of users and clustering of the users based on understanding the input parameters such as, for example time spent in the house and a priority stack is created with priorities of respective users of the house.)

The $P_{Ai}$ may be selected according to the current $U_i$ (cs,be) and priority $P_{Aip}$. After the duration of execution of $P_{Ai}$, a monitoring session continues. If $U_i$ (cs,be) is below a warning threshold for a configured amount of time, the monitoring session may be complete (e.g., finished) and the monitored session may be saved in the use history ($U_{i_H}$) for future reference.

Figure 7:
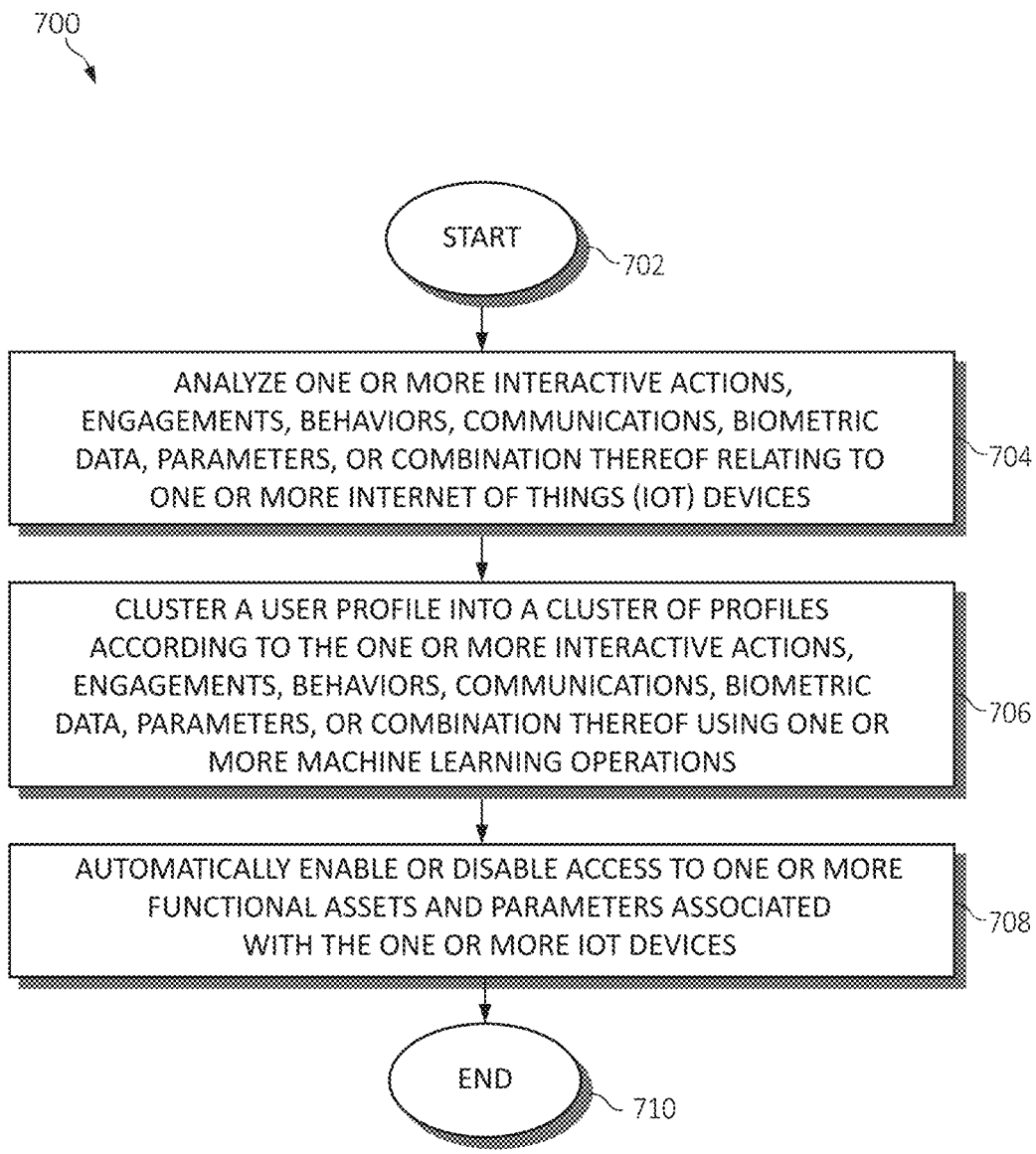
FIG. 7 is a flowchart diagram depicting an exemplary method for cognitive cluster learning in an Internet of Things (IoT) computing environment in which aspects of the present invention may be realized.

Turning now to FIG. 7, a method 700 for intelligent cluster learning in an Internet of Things (IoT) computing environment is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 7600 may start in block 702.

One or more of interactive actions, engagements, behaviors, communications, biometric data, parameters, or combination thereof relating to one or more IoT devices may be analyzed, as in block 704. A user profile may be clustered into a cluster of profiles according to the one or more of interactive actions, engagements, behaviors, communications, biometric data, parameters, or combination thereof using one or more machine learning operations, as in block 706. Access to one or more functional assets and parameters associated with the one or more IoT devices may be automatically enabled or disabled, as in block 708. The functionality 700 may end in block 710.

In one aspect, in conjunction with and/or as part of at least one block of FIG. 7, the operations of method 700 may include each of the following. The operations of method 700 may dynamically create the user profile upon detection of the one or more interactive actions, engagements, behaviors, communications, biometric data, parameters, or combination thereof with the one or more IoT devices, and also dynamically create the cluster of profiles according to collected feedback and assigned weights associated with the interactive actions, engagements, behaviors, communications, biometric data, parameters, or combination thereof.

The user profile may be assigned to the cluster of the profiles upon a confidence level exceeding a selected threshold. The confidence level may be determined that indicates an accuracy level of the user profile. The conference level of the user profile may increase according to a type of IoT device used by a user, a selected amount of time, or a combination thereof.

The operations of method 700 may identify a state of a user according to the one or more interactive actions, engagements, behaviors, communications, biometric data, parameters, or combination thereof using the one or more machine learning operations. The operations of method 700 may automatically create a dashboard with the cluster of profiles, and/or retain the user profile for a selected period of time in the cluster of profiles associated with the dashboard, wherein the dashboard enables a user access to the one or more functional assets and parameters associated with the one or more IoT devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent cluster learning in a computing environment, comprising:
analyzing one or more of interactive actions, engagements, behaviors, communications, biometric data, parameters, or combination thereof relating to one or more internet of things (IoT) devices;
clustering a user profile into a cluster of profiles according to the one or more of interactive actions, engagements, behaviors, communications, biometric data, parameters, or combination thereof using one or more machine learning operations, wherein the user profile is removed from a first profile in the cluster of profiles and cached in an encrypted guest profile in the cluster of profiles upon determining the one or more of interactive actions, engagements, behaviors, communications, biometric data, parameters, or combination thereof have been idle for a predetermined time period; and
automatically enabling or disabling access to one or more functional assets and parameters associated with the one or more IoT devices according to which profile in the cluster of profiles the user profile currently resides within.

2. The method of claim 1, further including dynamically creating the user profile upon detection of the one or more interactive actions, engagements, behaviors, communications, biometric data, parameters, or combination thereof with the one or more IoT devices.

3. The method of claim 1, further including dynamically creating the cluster of profiles according to collected feedback and assigned weights associated with the interactive actions, engagements, behaviors, communications, biometric data, parameters, or combination thereof.

4. The method of claim 1, further including assigning the user profile to the cluster of the profiles upon a confidence level exceeding a selected threshold.

5. The method of claim 1, further including:
determining a confidence level indicating an accuracy level of the user profile; or
increasing the conference level of the user profile according to a type of IoT device used by a user, a selected amount of time, or a combination thereof.

6. The method of claim 1, further including identifying a state of a user according to the one or more interactive actions, engagements, behaviors, communications, biometric data, parameters, or combination thereof using the one or more machine learning operations.

7. The method of claim 1, further including:
automatically creating a dashboard with the cluster of profiles; or
retaining the user profile for a selected period of time in the cluster of profiles associated with the dashboard, wherein the dashboard enables a user access to the one or more functional assets and parameters associated with the one or more IoT devices.

8. A system for intelligent cluster learning in an Internet of Things (IoT) computing environment, comprising:
one or more computers with executable instructions that when executed cause the system to:
analyze one or more of interactive actions, engagements, behaviors, communications, biometric data, parameters, or combination thereof relating to one or more internet of things (IoT) devices;
cluster a user profile into a cluster of profiles according to the one or more of interactive actions, engagements, behaviors, communications, biometric data, parameters, or combination thereof using one or more machine learning operations, wherein the user profile is removed from a first profile in the cluster of profiles and cached in an encrypted guest profile in the cluster of profiles upon determining the one or more of interactive actions, engagements, behaviors, communications, biometric data, parameters, or combination thereof have been idle for a predetermined time period; and
automatically enable or disable access to one or more functional assets and parameters associated with the one or more IoT devices according to which profile in the cluster of profiles the user profile currently resides within.

9. The system of claim 8, wherein the executable instructions further dynamically create the user profile upon detection of the one or more interactive actions, engagements, behaviors, communications, biometric data, parameters, or combination thereof with the one or more IoT devices.

10. The system of claim 8, wherein the executable instructions further dynamically create the cluster of profiles according to collected feedback and assigned weights associated with the interactive actions, engagements, behaviors, communications, biometric data, parameters, or combination thereof.

11. The system of claim 8, wherein the executable instructions further assign the user profile to the cluster of the profiles upon a confidence level exceeding a selected threshold.

12. The system of claim 8, wherein the executable instructions further:
determine a confidence level indicating an accuracy level of the user profile; or
increase the conference level of the user profile according to a type of IoT device used by a user, a selected amount of time, or a combination thereof.

13. The system of claim 8, wherein the executable instructions further identify a state of a user according to the one or more interactive actions, engagements, behaviors, communications, biometric data, parameters, or combination thereof using the one or more machine learning operations.

14. The system of claim 8, wherein the executable instructions further:
automatically create a dashboard with the cluster of profiles; or
retain the user profile for a selected period of time in the cluster of profiles associated with the dashboard, wherein the dashboard enables a user access to the one or more functional assets and parameters associated with the one or more IoT devices.

15. A computer program product for intelligent cluster learning by a processor, the computer program product comprising a non-transitory computer-readable storage medium having computer-readable program code portions stored therein, the computer-readable program code portions comprising:
an executable portion that analyzes one or more of interactive actions, engagements, behaviors, communications, biometric data, parameters, or combination thereof relating to one or more internet of things (IoT) devices;
an executable portion that clusters a user profile into a cluster of profiles according to the one or more of interactive actions, engagements, behaviors, communications, biometric data, parameters, or combination thereof using one or more machine learning operations, wherein the user profile is removed from a first profile in the cluster of profiles and cached in an encrypted guest profile in the cluster of profiles upon determining the one or more of interactive actions, engagements, behaviors, communications, biometric data, parameters, or combination thereof have been idle for a predetermined time period; and
an executable portion that automatically enables or disables access to one or more functional assets and parameters associated with the one or more IoT devices according to which profile in the cluster of profiles the user profile currently resides within.

16. The computer program product of claim 15, further including an executable portion that:
dynamically creates the user profile upon detection of the one or more interactive actions, engagements, behaviors, communications, biometric data, parameters, or combination thereof with the one or more IoT devices; and dynamically create the cluster of profiles according to collected feedback and assigned weights associated with the interactive actions, engagements, behaviors, communications, biometric data, parameters, or combination thereof.

17. The computer program product of claim 15, further including an executable portion that assigns the user profile to the cluster of the profiles upon a confidence level exceeding a selected threshold.

18. The computer program product of claim 15, further including an executable portion that:

determines a confidence level indicating an accuracy level of the user profile; or increases the conference level of the user profile according to a type of IoT device used by a user, a selected amount of time, or a combination thereof.

19. The computer program product of claim 15, further including an executable portion that identifies a state of a user according to the one or more interactive actions, engagements, behaviors, communications, biometric data, parameters, or combination thereof using the one or more machine learning operations.

20. The computer program product of claim 15, further including an executable portion that:

automatically create a dashboard with the cluster of profiles; or retains the user profile for a selected period of time in the cluster of profiles associated with the dashboard, wherein the dashboard enables a user access to the one or more functional assets and parameters associated with the one or more IoT devices.

\* \* \* \* \*